United States Patent [19]

Tamura

[11] 4,303,699
[45] Dec. 1, 1981

[54] METHOD OF MANUFACTURING MAGNETIC POWDER

[75] Inventor: Hideo Tamura, Tagajyo, Japan

[73] Assignee: Sony Corporation, Tokyo, Japan

[21] Appl. No.: 147,189

[22] Filed: May 6, 1980

[30] Foreign Application Priority Data

May 10, 1979 [JP] Japan .................................. 54-57374
Jun. 27, 1979 [JP] Japan .................................. 54-80955

[51] Int. Cl.$^3$ .............................................. B05D 5/12
[52] U.S. Cl. .................................... 427/132; 427/127; 427/128
[58] Field of Search ........................ 427/127, 128, 132

[56] References Cited

U.S. PATENT DOCUMENTS 4,125,474 11/1978 Dezawa et al. .................. 427/127 X Primary Examiner—Bernard D. Pianalto
Attorney, Agent, or Firm—Hill, Van Santen, Steadman, Chiara & Simpson

[57] ABSTRACT

A method of manufacturing magnetic power is disclosed which includes the steps of mixing acicular magnetic iron oxide powders and metallic cobalt in aqueous solution containing an alkali hydroxide and keeping the solution at an elevated temperature during the mixing step to cause deposition of cobalt and/or a cobalt compound on the surface of the iron oxide powders.

10 Claims, 2 Drawing Figures

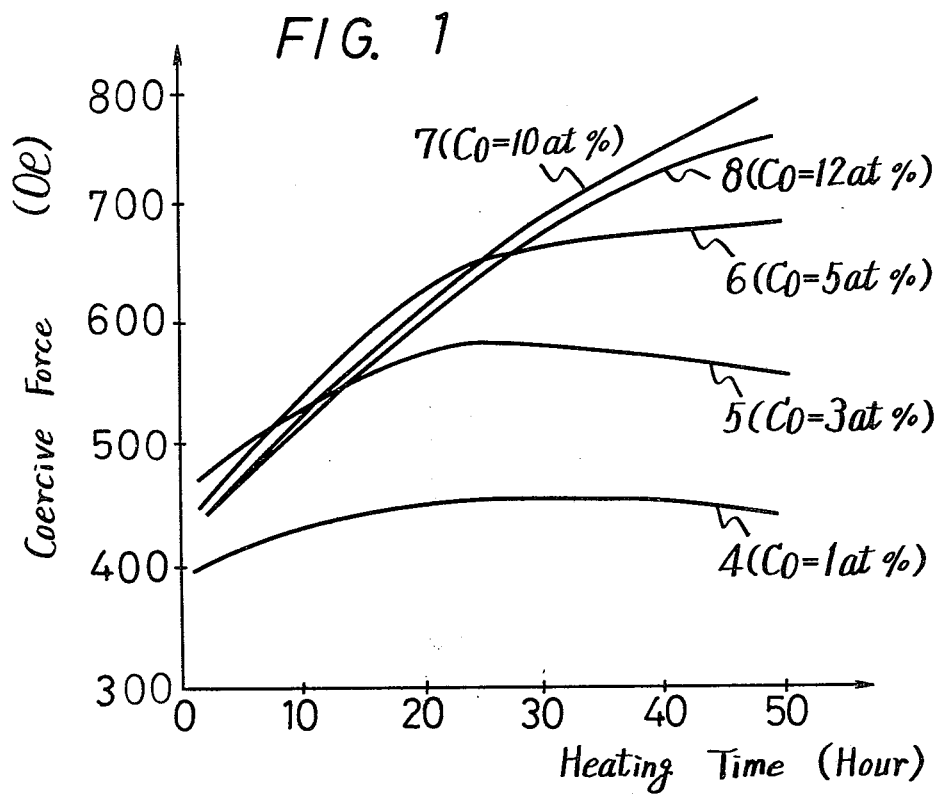
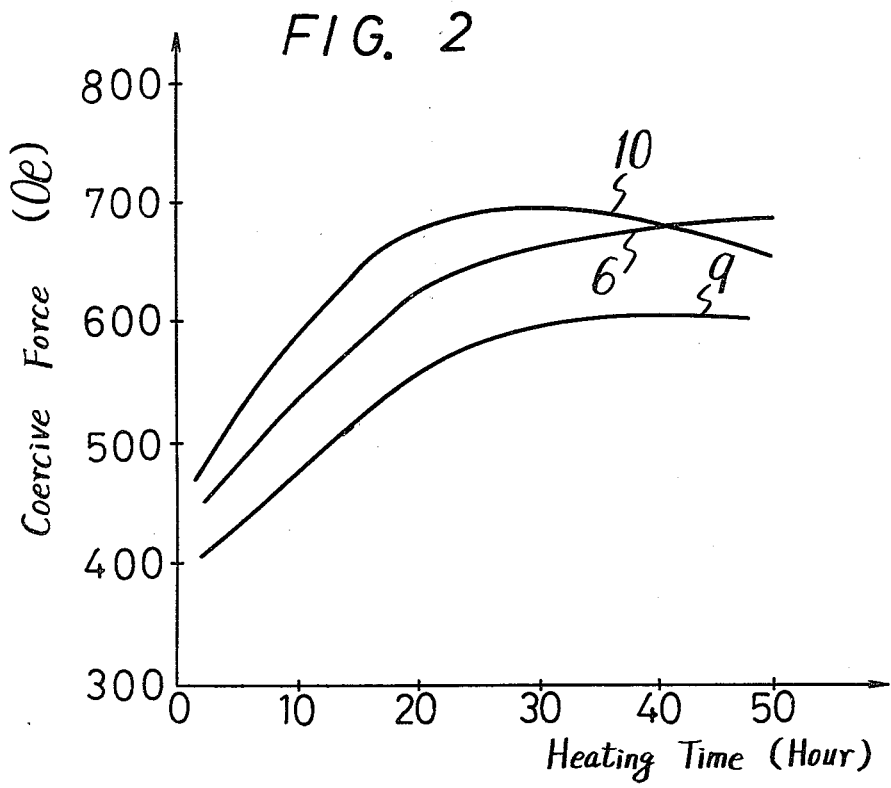

METHOD OF MANUFACTURING MAGNETIC POWDER

BACKGROUND OF THE INVENTION

1. Field of the Invention

The present invention relates generally to a method of manufacturing magnetic powder and is directed more particularly to a method of manufacturing magnetic iron oxide powder covered by cobalt and/or a cobalt compound suitable for use with a high density magnetic recording medium.

2. Description of the Prior Art

Recently, a cobalt containing magnetic iron oxide powder suitable for high density magnetic recording, has been developed. The magnetic powder proposed by the prior applicant in the application (Japanese Patent Application No. 79645/1977 which corresponds to the U.S. patent application Ser. No. 67,036 filed Aug. 16, 1979 which is a continuation application of U.S. Application Ser. No. 921,753 filed July 3, 1978) is characterized by the fact that cobalt is not diffused within the magnetic powder but is coated on the surface of the magnetic powder in the form of cobalt and/or a cobalt compound to make a magnetic powder with high coercive force, lower demagnetization caused by pressure and heat, and lower print through i.e. superior in print through effect.

In the method of manufacturing such kinds of magnetic powders proposed in my prior application, a cobalt salt is used as the starting material. Aqueous solution of this cobalt salt is mixed with an alkaline solution to form cobalt hydroxide Co(OH)$_2$ and then deposited on the surface of the magnetic powder. Generally speaking, cobalt hydroxide has a tendency to form a gel. In this case, it is rather difficult to deposite the cobalt hydroxide uniformly on the surface of the magnetic powder without gelation of the cobalt hydroxide.

OBJECTS AND SUMMARY OF THE INVENTION

Accordingly, it is an object of the present invention to provide a method of manufacturing improved magnetic powder.

It is another object of the invention to provide a method of manufacturing magnetic powder suitable for use with a high density magnetic recording medium.

It is a further object of the present invention to provide a method of manufacturing cobalt modified iron oxide magnetic powder suitable for use with a magnetic recording medium.

It is a further object of the invention to provide a method of manufacturing cobalt modified iron oxide magnetic powder which can decrease the electrical resistance or resistivity of a magnetic recording medium which uses the magnetic powder.

It is a still further object of the invention to provide a method of manufacturing cobalt modified iron oxide magnetic powder which provides superior print through characteristics to a magnetic recording medium which uses the magnetic powder.

According to an aspect of the present invention, there is provided a method of manufacturing magnetic powder comprising the steps of:

(a) mixing acicular magnetic iron oxide powder and metallic cobalt in an aqueous solution containing an alkali hydroxide; and (b) keeping said solution at an elevated temperature during said mixing to cause deposition of cobalt and/or a cobalt compound on surface of said iron oxide powder.

Other objects, features and advantages of the present invention will be apparent from the following description taken in conjunction with the accompanying drawings.

BRIEF DESCRIPTION OF THE DRAWINGS

FIGS. 1 and 2 are respectively graphs showing measured relations between heating time and coercive force.

DESCRIPTION OF THE PREFERRED EMBODIMENTS

Now, the present invention will be hereinafter described.

According to the method of manufacturing magnetic powder of the present invention, acicular magnetic powder, which will become the core and cobalt metal are heated in an aqueous solution containing an alkali hydroxide to provide magnetic iron oxide powder covered by cobalt and/or a cobalt compound.

In this case, as the acicular magnetic powder serving as the core, for example, gamma-ferric oxide powder ($\gamma$-Fe$_2$O$_3$), magnetite powder (Fe$_3$O$_4$), mixed crystal powder of gamma-ferric oxide and magnetite or acicular magnetic powder of the above containing cobalt can be used. Further, the alkali concentration of the aqueous solution containing alkali is selected as 0.1 to 10 mols/l or desirably 1 to 7 mols/l when the magnetic powder and cobalt metal are immersed therein, and the heating temperature is selected as 60° C. to 150° C. The added amount of cobalt (Co/Fe) is selected as 0.1 to 10 atomic % or desirably 1 to 5 atomic %.

Now, examples of the invention will be described.

EXAMPLE 1

30 l of water were poured into a container made of stainless steel with the capacity of 50 l. Then, into the container added were 5.0 Kg of acicular $\gamma$-Fe$_2$O$_3$ magnetic powder (which had coercive force Hc of 383 Oe, longer axis of about 0.5 $\mu$m and aspect ratio (axis ratio) of 6 to 8), 130 g of metal cobalt powder (which had the average powder size of 1 to 2 $\mu$m) and 4.8 Kg of sodium hydroxide (NaOH). Then, they were heated up to the boiling temperature while being mixed by agitator. The above amounts mean that the added amount of Co to Fe of the magnetic powdr (Co/Fe) was about 3.5 atomic %, and the alkali concentration was about 4 mols/l. After heating for 20 hours, the reaction solution was made neutral in pH by rinsing with water, and then dried by dehydration to provide magnetic powder with cobalt and/or cobalt compound coated on the surface thereof. The magnetic characteristics of this manufactured magnetic powder were such that its coercive force Hc was 615 Oe, its saturation magnetization $\sigma_s$ was 78.6 emu/g, and the rectangular ratio $\sigma_r/\sigma_s$ between the residual magnetization $\sigma_r$ and saturation magnetization $\sigma_s$ was 0.49. The magnetic powder was partially reduced and contains ferrous ion (Fe$^{2+}$) by Fe$^{2+}$/Fe$^{3+}$=0.06. Further, it was ascertained that the magnetic powder contains Co mainly in the form of Co$_3$O$_4$ or the like by 3.4 atomic % (Co/Fe), which covered the surface of the magnetic powder, by the electron beam diffraction method and X-ray photoelectron spectroscopy. The magnetic iron oxide powder covered by cobalt and cobalt compound thus manufactured was used to provide a magnetic tape i.e. magnetic recording medium. That is, the magnetic powder produced as above, under the following composition, was mixed in a ball mill for about 48 hours to prepare magnetic paint.

Magnetic powder covered by cobalt compound ... 100 parts by weight
Vinyl chloride . vinyl acetate copolymer (binder) (VAGH: Trade Name, made by Union Carbide Corp.) ... 17.5 parts by weight
Polyurethane resin ... 7.5 parts by weight (binder) (Estane 5702: Trade Name, made by B. F. Goodrich chemical Co.)
Lecithin ... 2.0 parts by weight (dispersion agent)
Methyl ethyl ketone ... 100 parts by weight (solvent)
Cyclohexanone ... 100 part by weight (solvent)

This magnetic paint was coated on a film made of polyethylene terephthalate with a thickness of $12\mu$ in such an amount that the thickness of the magnetic paint after being dried was 6 $\mu$m to provide a magnetic tape. The magnetic tape thus provided had magnetic characteristics such that its coercive force Hc was 605 Oe, its saturation magnetic flux density Bm was 2050 G (gauss), its residual magnetic flux density Br was 1740 G, its rectangular ratio was 0.85 (Br/Bm=0.85), and its resistivity was $2.0\times10^8$ $\Omega/cm^2$. Further, its print through value, which was measured according to the Japanese Industrial standard (JIS) system, was $-52.0$ dB.

For the sake of comparison, magnetic powder covered by cobalt using a cobalt salt will be exemplified as follows:

Comparison example 1

Acicular $\gamma$-$Fe_2O_3$ magnetic powder (having a coercive force Hc of 383 Oe, longer axis of about 0.5 $\mu$m and aspect ratio of 6 to 8 similar to that used in the example 1) was reduced in hydrogen gas atmosphere at 250° C. The magnetic powder thus prepared had magnetic characteristics such that Hc=370 Oe, $\sigma s$=79.0 emu/g and $\sigma r/\sigma s$=0.45 and contained $Fe^{2+}$ ion by $Fe^{2+}/Fe^{3+}$=0.09.

Then, 20 l of water were poured into a container made of stainless steel. Then, 5.0 Kg of the above magnetic powder, 520 g of a first grade cobalt chloride ($CoCl_2.6H_2O$) now on market and an aqueous solution consisting of 10 l of water and 3.7 Kg of first grade sodium hydroxide (NaOH) dissolved therein were added to the container. The mixture was heated at its boiling point while being stirred by an agitator. By this treatment, on the surface of the magnetic powder, coated was a cobalt compound at about 3.5 atomic % (ratio of Co/Fe). After heating for 1 hour, the magnetic powder was rinsed and dehydrated by the similar manner to the example 1. Thus prepared magnetic powder had magnetic characteristics such that Hc=572 Oe, $\sigma s$=75.8 emu/g, $\sigma r/\sigma s$=0.49 and contains $Fe^{2+}$ ion by $Fe^{2+}/Fe^{3+}$=0.08.

The magnetic powder provided as above was used similar to the example 1 to produce a magnetic tape. This magnetic tape had magnetic characteristics such that Hc=580 Oe, Bm=1830 G, Br=1500 G, Br/Bm=0.82, resistivity of $6.0\times10^{10}$ $\Omega/cm^2$ and the print through value of $-48$ dB.

As described above, the magnetic powder of comparison example 1 contains $Fe^{2+}$ ion more than that of example 1, but the resistivity of the former coated on the tape as the magnetic medium was higher than that of the latter. The reason may be that the magnetic powder of comparison example 1 contains $Fe^{2+}$ ion but the $Fe^{2+}$ ion is homogeneous in the magnetic powder, while the surface of the magnetic powder is covered by cobalt hydroxide so that $Fe^{2+}$ ion can not serve to lower the resistivity so much.

In the art, such a method is proposed in which a magnetic powder of cobalt coated type is further reduced in a reductive gas for $Fe^{2+}$ ion to be contained in the magnetic powder. According to this method, however, the control for the thermal treatment in reduction is difficult, and cobalt is diffused into the inside of the magnetic powder during the thermal treatment to deteriorate the print through characteristics of the magnetic recording medium made by using the magnetic powder.

Now, comparison example 2 will be described as an example of the above.

Comparison Example 2

Acicular $\gamma$-$Fe_2O_3$ magnetic powder (having the coercive force Hc of 383 Oe, longer axis of about 0.5 $\mu$m and aspect ratio of 6 to 8) was prepared.

Then, 20 l of water were poured into a container made of stainless steel. Then, 5.0 Kg of the above magnetic powder, 520 g of first grade cobalt chloride ($CoCl_2.6H_2O$) now on market and aqueous solution consisting of 10 l of water and 3.7 Kg of first grade sodium hydroxide (NaOH) dissolved in the water were added to the container. The mixture was heated at its boiling point while being stirred by an agitator. By this treatment, on the surface of the magnetic powder, coated was cobalt compound at about 3.5 atomic % (ratio of Co/Fe). After heating for 1 hour, the magnetic powder coated with cobalt compound was rinsed and dehydrated by the similar manner to example 1. Thus prepared magnetic powder had magnetic characteristics such that Hc=560 Oe, $\sigma s$=73.4 emu/g, $\sigma r/\sigma s$=0.49 and contained $Fe^{2+}$ ion by $Fe^{2+}/Fe^{3+}$=0.00.

Then, the above magnetic powder was reduced in hydrogen gas at 250° C. for 1 hour. The magnetic powder thus prepared had magnetic characteristics such that Hc=590 Oe, $\sigma s$=77.4 emu/g and $\sigma r/\sigma s$=0.50 and contained $Fe^{2+}$ ion by $Fe^{2+}/Fe^{3+}$=0.08.

The magnetic powder provided as above was used similar to the example 1 to produce a magnetic tape. This magnetic tape had magnetic characteristics such that Hc=595 Oe, Bm=1840 G, Br=1560 G, Br/Bm=0.85, resistivity of $5.0\times10^9$ $\Omega/cm^2$ and the print through value of $-46$ dB.

The following table 1 shows the resistivities and print through values of magnetic tapes using the magnetic powders prepared by the example 1 of the invention and comparison examples 1 and 2.

TABLE 1

| | $Fe^{2+}$ion($Fe^{2+}/Fe^{3+}$) contained magnetic powder in the | Resistivity ($\Omega/cm^2$) | Print through value dB |
|---|---|---|---|
| Example 1 | 0.06 | $2.0\times10^8$ | $-52$ |
| Comparison Example 1 | 0.08 | $6.0\times10^{10}$ | $-48$ |
| Comparison son | 0.08 | $5.0\times10^9$ | $-46$ |

TABLE 1-continued

| | $Fe^{2+}$ion($Fe^{2+}/Fe^{3+}$) contained magnetic powder in the | Resistivity ($\Omega/cm^2$) | Print through value dB |
|---|---|---|---|
| Example 2 | | | |

From the above table 1, it will be understood that, according to the method of the invention, the resistivity of the magnetic tape can be effectively lowered without deteriorating the print through characteristic of the magnetic tape.

According to the method of the invention, the amount of $Fe^{2+}$ ion contained in the magnetic iron oxide powder covered by cobalt and cobalt compound can be controlled by blowing various kinds of gases into the reaction mixture during the heating treatment.

Examples of the invention in this case will be described now.

EXAMPLE 2

In the method similar to example 1, air was introduced in the reaction liquid at 10 l/min during the heat treatment while the reaction liquid was heated in 48 hours. The magnetic powder thus prepared had magnetic characteristics such that $Hc=580$ Oe, $\sigma s=74.8$ emu/g, $\sigma r/\sigma s=0.49$ and $Fe^{2+}/Fe^{3+}=0.00$.

EXAMPLE 3

In the method similar to example 1, the reaction container was covered during the heat treatment while nitrogen gas was introduced to the reaction liquid at 15 l/min and the reaction liquid was heated for 20 hours. The magnetic powder thus prepared had the magnetic characteristics of $Hc=605$ Oe, $\sigma s=79.2$ emu/g, $\sigma r/\sigma s=0.49$ and $Fe^{2+}/Fe^{3+}=0.09$.

The coercive force Hc of the magnetic powder manufactured by the method of this invention can be controlled by changing the added amount of metallic cobalt. Examples of the invention in this case will be examplified as follows.

EXAMPLE 4

In the method similar to example 1, the added amount of metallic cobalt was selected as 1 atomic % (Co/Fe) and the mixture was heated for 48 hours. Then, magnetic iron oxide powder covered by cobalt and cobalt compound was made.

EXAMPLE 5

In the method similar to example 1, the added amount of metallic cobalt was selected as 3 atomic % (Co/Fe) and the mixture was heated for 48 hours. Then, magnetic iron oxide powder covered by cobalt and cobalt compound was made.

EXAMPLE 6

In the method similar to example 1, the added amount of metallic cobalt was selected as 5 atomic % (Co/Fe) and the mixture was heated for 48 hours. Then, magnetic iron oxide powder covered by cobalt and cobalt compound was made.

EXAMPLE 7

In the method similar to example 1, the added amount of metal cobalt was selected as 10 atomic % (Co/Fe) and the mixture was heated for 48 hours. Then, magnetic iron oxide powder covered by cobalt and cobalt compound was made.

EXAMPLE 8

In the method similar to example 1, the added amount of metal cobalt was selected as 12 atomic % (Co/Fe) and the mixture was heated for 48 hours. Then, magnetic iron oxide powder covered by cobalt compound was made.

The measured relation of the heating time and the coercive force of each of examples 4 through 8 is shown in the graph of FIG. 1 by curves 4 to 8. These measurements were carried out on the magnetic powders which were sequentially sampled during their heating. When the added amount of metal cobalt exceeds 10 atomic %, the increase of Hc caused by the increase of added metallic cobalt disappears. This is caused by the fact that, according to the method of the invention, the reason of increase in Hc resides on the surface of the magnetic powder, and hence even if the added amount of cobalt is increased, there is limitation in the amount of cobalt which could be bonded to the surface of the magnetic powder to increase Hc. In this case, it is ascertained that the range of the adding amount of cobalt (Co/Fe) is desirably 0.1 to 10 atomic % and more preferably 1 to 5 atomic %.

Further, according to the method of the invention, the heating time, which is required to increase Hc of the magnetic powder, can be shortened by increasing the alkali concentration of the aqueous solution containing alkali. Examples of the invention in this case will be described now.

EXAMPLE 9

In the method similar to example 6, the concentration of sodium hydroxide while being heated was selected as about 1 mol/l.

EXAMPLE 10

In the method similar to example 6, the concentration of sodium hydroxide while being heated was selected as about 10 mol/l.

The relation between the heating time and Hc of each of examples 9 and 10 was measured, which resulted in the graph of FIG. 2. In the graph of FIG. 2, curves 9 and 10 respectively represent the measured results of examples 9 and 10 and a curve 6 represents the similar measured result of example 6.

According to the method of the invention, the alkali concentration of the aqueous solution containing alkali can be in the range from 0.1 mol/l to 10 mol/l. In fact, cobalt could be coated on the surface of the magnetic powder under the alkali concentration lower than 0.1 mol/l, but in this case, the dissolving speed of metallic cobalt become low which requires long heating time. While, when the alkali concentration exceeds 10 mol/l, the effect of increasing the coercive force can not be found any more. Thus, it is preferred that the alkali concentration is selected between 0.1 mol/l and 10 mol/l and especially 1 mol/l and 7 mol/l.

As the alkali used in the method of the present invention, in addition to the sodium hydroxide, alkali hydroxide such as lithium hydroxide, potassium hydroxide or the like can be used. Further, it is suitable to select the heating temperature in the aqueous solution containing alkali in the method of the invention within the range of 60° C. to 150° C. It is possible to coat cobalt on the magnetic powder at a temperature lower than 60° C., but it requires a long time to present a high coercive force Hc, which is not desired in view of practice.

While, if an autoclave is employed as the heating container to achieve the heating temperature higher than the boiling point under the atmospheric pressure, the increase of Hc by the heating can be made more rapid. However, as the heating temperature exceeds 150° C. and comes near about 200° C., a problem occurs in that the magnetic powder dissolves in the aqueous solution containing alkali.

EXAMPLE 11

5 l of water was poured into a container made of stainless steel with the capacity of 10 l into which 2.0 Kg of the acicular $\gamma$-$Fe_2O_3$ magnetic powder used in the example 1, 52 g of metallic cobalt power and 0.2 Kg of sodium hydroxide were introduced. Then, the mixture was sufficiently stirred by an agitator. The mixture solution thus prepared was introduced into an autoclave and heated at 150° C. in 3 hours, which resulted in that cobalt was added to the magnetic powder at 3.5 atomic % (Co/Fe) in the alkali with the concentration of about 1 mol/l. After the heat treatment, the mixture was rinsed and dried by dehydration to form the magnetic iron oxide powder covered with cobalt and cobalt compound similar to the example 1. The magnetic powder thus made had magnetic characteristics such that Hc=570 Oe, $\sigma s$=79.0 emu/g and $\sigma r/\sigma s$=0.49 and contains $Fe^{2+}$ ion by $Fe^{2+}/Fe^{3+}$=0.08.

Further, as the accicular magnetic powder which becomes the core, in addition to $\gamma$-$Fe_2O_3$ as in example 11, $Fe_3O_4$ or mixed crystal powder of $\gamma$-$Fe_2O_3$ and $Fe_3O_4$ or the same as the former but containing cobalt can be used.

EXAMPLE 12

5.0 Kg of iron oxide magnetic powder (Hc=345 Oe) with $Fe^{2+}/Fe^{3+}$=0.12 was dispersed into 30 l of water which was introduced into a container made of stainless steel and 50 l in capacity. Then, 110 g of metal cobalt powder (powder size less than 80 mesh) were introduced in the container, 6.7 Kg of first grade potassium hydroxide on market was then introduced in the container, and then the resultant mixture was stirred sufficiently by an agitator and heated at the boiling point. After the heating of 20 hours, the mixture was rinsed and dried by dehydration to be magnetic powder. The magnetic powder thus made had such magnetic characteristics that Hc=608 Oe, $\sigma s$=82.0 emu/g, $\sigma r/\sigma s$=0.49 and $Fe^{2+}/Fe^{3+}$=0.16.

The magnetic iron oxide powder covered by cobalt and cobalt compound thus made was used to provide a magnetic tape by the manner similar to that of the example 1. The magnetic characteristics of this magnetic tape were such that Hc=593 Oe, Bm=2070 G, Br=1760 G, Rs(Br/Bm)=0.85, resistivity=8.5×$10^7$ $\Omega$/$cm^2$ and print through value=−50 dB.

EXAMPLE 13

30 l of water was poured into a container made of stainless steel and with the capacity of 50 l and 6 Kg of first grade sodium hydroxide on market were dissolved in the water. In to this aqueous solution, introduced were 5.0 Kg of acicular iron oxide magnetic powder containing cobalt (containing amount of cobalt was 1.7 atomic % (Co/Fe), Hc=618 Oe and $Fe^{2+}/Fe^{3+}$=0.20 and 184 g of metal cobalt powder. The resultant mixture was heated at the boiling point while being stirred by an agitator. After the heating of 20 hours, the heated mixture was rinsed and dried by dehydration to provide magnetic powder which had such magnetic characteristics that Hc=880 Oe, $\sigma s$=82.1 emu/g, $\sigma r/\sigma s$=0.51 and $Fe^{2+}/Fe^{3+}$=0.22.

In the method of the invention, the metallic cobalt is desired to be in the form of powders because it can be rapidly dissolved into alkali solution, but it is of no need that the metallic cobalt be limited to powders.

The magnetic iron oxide powder covered by cobalt and cobalt compound thus made was used to provide a magnetic tape by the manner similar to that of the example 1. The magnetic characteristics of this magnetic tape were such that Hc=902 Oe, Bm=2020 G, Br=1720 G, Rs(Br/Bm)=0.85, resistivity=4.0×$10^7$ $\Omega$/$cm^2$ and print through value=−51.5 dB.

EXAMPLE 14

30 l of water was poured into a container made of stainless steel and with the capacity of 50 l. Then, 3.0 Kg of acicular $\gamma$-$Fe_2O_3$ used in the example 1, 3.6 Kg of first grade sodium hydroxide and 1.0 Kg of metal cobalt grain (grain size of 5 mm to 10 mm) were introduced into the container. Then, the resultant mixture was heated at the boiling point while being sufficiently stirred by an agitator. After the heating of 20 hours, the heated mixture was treated to have neutral pH by water rinsing and the mixture or reaction liquid was passed through a sieve to separate the metallic cobalt. Thereafter, the mixture was rinsed and dried by dehydration to provide magnetic iron oxide power covered by cobalt and cobalt compound which had such magnetic characteristics that Hc=510 Oe, $\sigma s$=77.5 emu/g, $\sigma r/\sigma s$=0.47 and $Fe^{2+}/Fe^{3+}$=0.05. In this example, it was ascertained that the cobalt was coated on the magnetic powder by 2.0 atomic % (Co/Fe).

The magnetic iron oxide powder covered by cobalt and cobalt compound thus made was used to provide a magnetic tape by the manner similar to that of the example 1. The magnetic characteristics of this magnetic tape were such that Hc=503 Oe, Bm=2130 G, Br=1830 G, Rs(Br/Bm)=0.86, resistivity=2.5×$10^8$$\Omega$/$cm^2$ and print through value=−53.5 dB.

According to the method of the invention described as above, the metallic cobalt is gradually dissolved in the alkali solution to gradually and homogeneously cover the acicular magnetic powder which serves as core, so that the surface of magnetic powder, on which cobalt has been coated, is kept uniform and fine.

Further, on the surface of the magnetic powder manufactured by the method of the invention, there exists no OH radical of cobalt hydroxide and hence the magnetic powder is not so strong in hydrophilic property. Therefore, during manufacturing of a magnetic recording medium such as a magnetic tape, the dispersion property of the magnetic powder in organic solvent can be prevented from being lowered. Thus, the magnetic iron oxide powder covered by cobalt and cobalt compound according to the present invention can be much improved in dispersion property as compared with the magnetic powder made by the cobalt hydroxide absorption method when coated on the base of the magnetic tape.

According to the method of the present invention, the surface of the magnetic powder is reduced little by cobalt and hence $Fe^{2+}$ ion is contained, so that when the magnetic powder is coated on the base of the magnetic tape, its resistivity can be effectively lowered.

In general, it is known as one method that $Fe^{2+}$ ion is contained in iron oxide magnetic powder to be coated. In this case, the lowering amount of the resistivity becomes different dependent upon the manner for $Fe^{2+}$ ion to be contained. Thus, it is important how the $Fe^{2+}$ ion is contained so as to effectively lower the resistivity. According to the method of the invention, it is possible that the $Fe^{2+}$ ion can be produced near the surface of the magnetic powder, which affects much on the resistivity, by the cobalt covering the surface of the magnetic powder. Therefore, the resistivity of the magnetic medium can be lowered without lowering the print through characteristic thereof not so much.

It will be apparent that many modifications and variations could be effected by one skilled in the art without departing from the spirits or scope of the novel concepts of the present invention, so that the spirits or scope of the invention should be determined by the appended claims only.

I claim as my invention:

1. Method of manufacturing magnetic powder, consisting of:
    (a) forming a mixture consisting essentially of acicular magnetic iron oxide powder and metallic cobalt in an aqueous solution of an alkali hydroxide having a concentration of 0.1 mol/l to 10 mol/l under agitation, and
    (b) keeping said solution at an elevated temperature during said agitation to cause deposition of cobalt and/or cobalt compound on surface of said iron oxide powder.

2. Method according to claim 1, wherein said alkali hydroxide is sodium hydroxide, potassium hydroxide or lithium hydroxide.

3. Method according to claim 1, wherein said concentration is selected at 1 mol/l to 7 mol/l.

4. Method according to claim 1, wherein said elevated temperature is between 60° and 150° C.

5. Method according to claim 1, wherein said metallic cobalt is in a form of fine powder.

6. Method according to claim 1, wherein said iron oxide is gamma-ferric oxide, magnetite, intermediate iron oxide having a ratio of ferrous to ferric ions greater than 0 but less than 0.5, or cobalt containing iron oxide.

7. Method according to claim 6, wherein said iron oxide is gamma ferric oxide.

8. Method according to claim 1, wherein a gas introduced into said solution during keeping said solution at an elevated temperature to control the ratio of ferrous to ferric ions of the resulting magnetic powder.

9. Method according to claim 8, wherein said gas is air.

10. Method according to claim 8, wherein said gas is nitrogen.

* * * * *